United States Patent
Huang et al.

(10) Patent No.: US 12,052,750 B2
(45) Date of Patent: Jul. 30, 2024

(54) DIFFERENT MODULATION ORDERS AND NUMBER OF MIMO LAYERS FOR HP AND LP UCI MULTIPLEXING ON PUSCH

(71) Applicant: QUALCOMM Incorporated, San Diego, CA (US)

(72) Inventors: Yi Huang, San Diego, CA (US); Wei Yang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 17/653,109

(22) Filed: Mar. 1, 2022

(65) Prior Publication Data

US 2022/0386324 A1 Dec. 1, 2022

Related U.S. Application Data

(60) Provisional application No. 63/193,044, filed on May 25, 2021.

(51) Int. Cl.
| | |
|---|---|
| *H04W 72/566* | (2023.01) |
| *H04L 1/00* | (2006.01) |
| *H04W 72/1263* | (2023.01) |
| *H04W 72/21* | (2023.01) |

(52) U.S. Cl.
CPC ......... *H04W 72/569* (2023.01); *H04L 1/0003* (2013.01); *H04W 72/1263* (2013.01); *H04W 72/21* (2023.01)

(58) Field of Classification Search
None
See application file for complete search history.

(56) References Cited

U.S. PATENT DOCUMENTS

| | | | |
|---|---|---|---|
| 2011/0299500 A1* | 12/2011 | Papasakellariou | H04W 72/21 370/329 |
| 2013/0039332 A1* | 2/2013 | Nazar | H04B 7/0452 370/330 |
| 2013/0058315 A1* | 3/2013 | Feuersanger | H04W 52/346 370/336 |
| 2018/0103488 A1* | 4/2018 | Marinier | H04L 5/0007 |
| 2019/0297580 A1* | 9/2019 | Huang | H04W 52/04 |
| 2020/0359371 A1* | 11/2020 | Takeda | H04W 16/28 |
| 2021/0360634 A1* | 11/2021 | Huang | H04L 5/0053 |
| 2022/0078768 A1* | 3/2022 | El Hamss | H04L 5/0055 |
| 2022/0217709 A1* | 7/2022 | Yang | H04L 1/0017 |
| 2023/0362922 A1* | 11/2023 | Yuan | H04B 7/0413 |

* cited by examiner

*Primary Examiner* — Kenny S Lin
(74) *Attorney, Agent, or Firm* — Procopio, Cory, Hargreaves & Savitch LLP

(57) ABSTRACT

A UE may multiplex first UCI of a first priority with second UCI of a second priority. The first UCI may include at least one of a first modulation order or a first number of MIMO layers, and the second UCI may include at least one of a second modulation order or a second number of MIMO layers. The first modulation order of the first UCI may be greater than or equal to the second modulation order of the second UCI, and the first number of MIMO layers of the first UCI may be greater than or equal to the second number of MIMO layers of the second UCI. The UE may transmit, to a base station, an UL transmission including the first UCI of the first priority multiplexed with the second UCI of the second priority, where the second priority corresponds to a higher priority than the first priority.

30 Claims, 13 Drawing Sheets

DIFFERENT MODULATION ORDERS AND NUMBER OF MIMO LAYERS FOR HP AND LP UCI MULTIPLEXING ON PUSCH

CROSS REFERENCE TO RELATED APPLICATION(S)

This application claims the benefit of and priority to U.S. Provisional Application Ser. No. 63/193,044, entitled "DIFFERENT MODULATION ORDERS AND NUMBER OF MIMO LAYERS FOR HP AND LP UCI MULTIPLEXING ON PUSCH" and filed on May 25, 2021, which is expressly incorporated by reference herein in its entirety.

TECHNICAL FIELD

The present disclosure relates generally to communication systems, and more particularly, to different modulation orders and number of multiple-input multiple-output (MIMO) layers for multiplexing high priority (HP) and low priority (LP) uplink control information (UCI).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may multiplex first uplink control information (UCI) of a first priority with second UCI of a second priority, the first UCI including at least one of a first modulation order or a first number of multiple-input multiple-output (MIMO) layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and transmit, to a base station, an uplink (UL) transmission including the first UCI of the first priority multiplexed with the second UCI of the second priority, the second priority corresponding to a higher priority than the first priority.

In another aspect of the disclosure, a method, a computer-readable medium, and an apparatus are provided. The apparatus may signal, to a user equipment (UE), information associated with at least one of first UCI of a first priority or second UCI of a second priority, the second priority corresponding to a higher priority than the first priority; and receive, from the UE based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
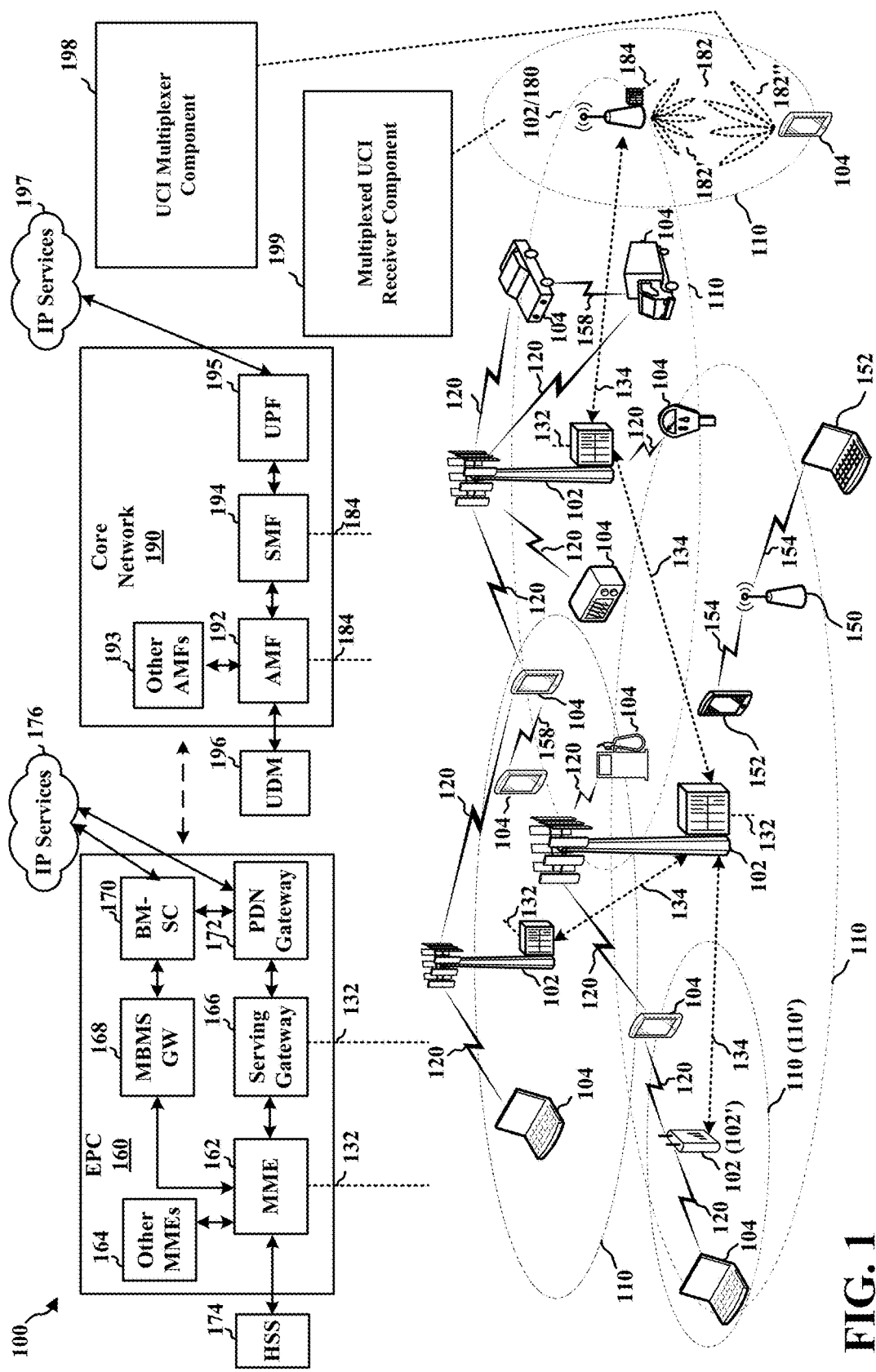
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, user equipments (UEs) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. A network node can be implemented as a base station (i.e., an aggregated base station), as a disaggregated base station, an integrated access and backhaul (IAB) node, a relay node, a sidelink node, etc. A network entity can be implemented as a base station (i.e., an aggregated base station), or alternatively, as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture.

Referring again to FIG. 1, in certain aspects, the UE 104 may include an uplink control information (UCI) multiplexer component 198 configured to multiplex first UCI of a first priority with second UCI of a second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and transmit, to a base station, an UL transmission including the first UCI of the first priority multiplexed with the second UCI of the second priority, the second priority corresponding to a higher priority than the first priority.

In certain aspects, the base station 180 may include a multiplexed UCI receiver component 199 configured to signal, to a UE, information associated with at least one of first UCI of a first priority or second UCI of a second priority, the second priority corresponding to a higher priority than the first priority; and receive, from the UE based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI. Although the following description may be focused on 5G NR, the concepts described herein may be applicable to other similar areas, such as LTE, LTE-A, CDMA, GSM, and other wireless technologies.

Figure 2:
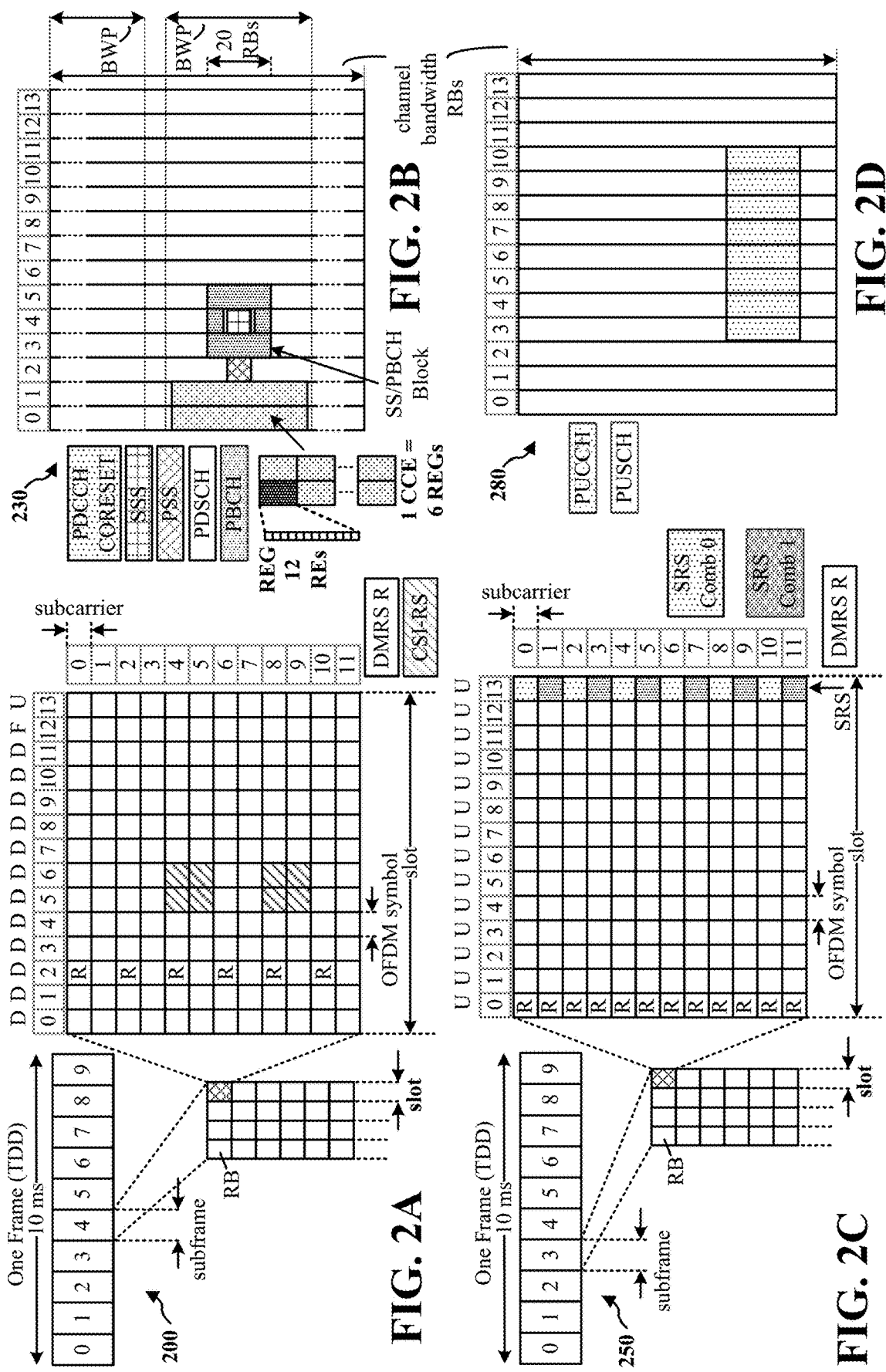
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries UCI, such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
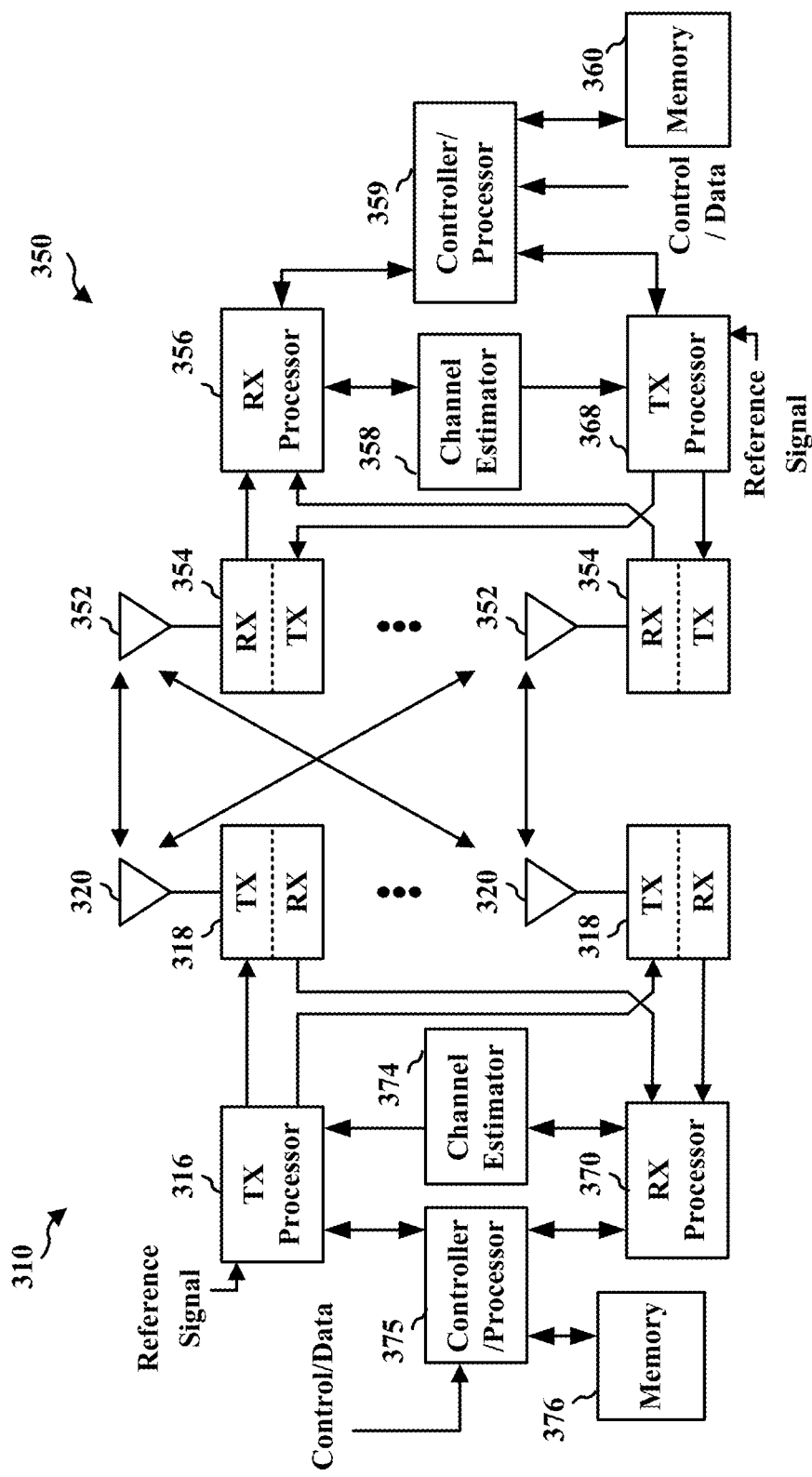
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350.

If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the UCI multiplexer component 198 of FIG. 1.

At least one of the TX processor 316, the RX processor 370, and the controller/processor 375 may be configured to perform aspects in connection with the multiplexed UCI receiver component 199 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
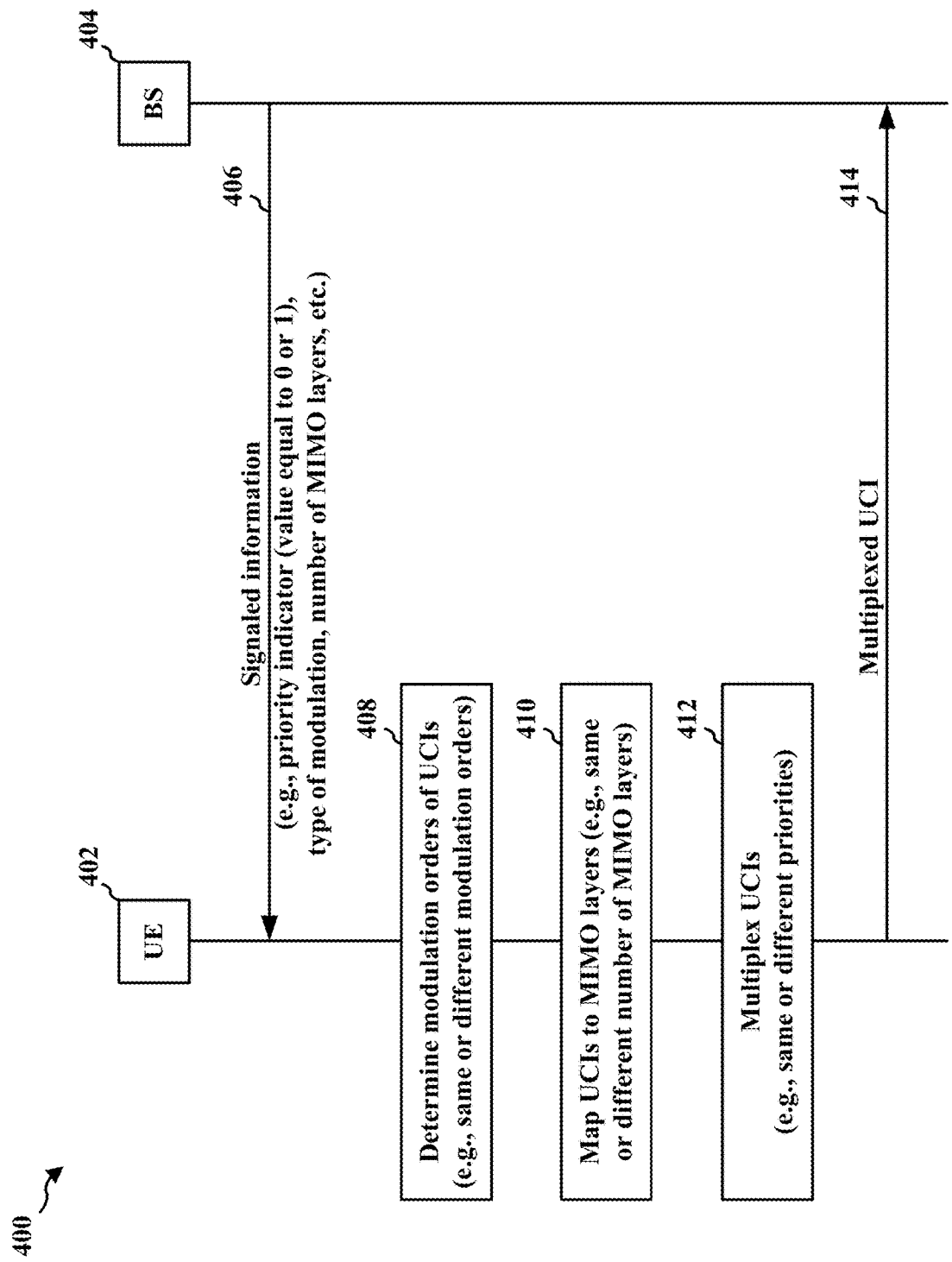
FIG. 4 is a call flow diagram illustrating communications between a UE and a base station.

FIG. 4 is a call flow diagram 400 illustrating communications between a UE 402 and a base station 404. At 406, the base station 404 may transmit signaled information to the UE 402. The signaled information may include a priority indicator indicative of a priority of one or more associated UCIs. For example, a first priority may be associated with low priority (LP) UCI and a second priority may be associated with high priority (HP) UCI. The priority indicator may indicate the first priority/LP based on a value of 0, and the priority indicator may indicate the second priority/HP based on a value of 1. In a first example, the first priority and/or the second priority may be indicated via the signaled information transmitted, at 406, based on a DCI that schedules a PDSCH associated with the UCIs (e.g., a HARQ-ACK associated with the PDSCH). In a second example, the first priority and/or the second priority may be indicated via the signaled information transmitted, at 406, based on an RRC configuration (e.g., periodic channel state information (CSI) feedback).

The signaled information may also be indicative of a type of modulation and/or a number of MIMO layers. For example, if a first modulation order, such as 64 quadrature amplitude modulation (QAM), is to be greater than a second modulation order, the signaled information may indicate whether the second modulation order is 16 QAM, QPSK, or BPSK. Similarly, if a first number of layers, such as 4 layers, is to be greater than a second number of layers, the signaled information may also indicate whether the second number of layers is 3 layers, 2 layers, or 1 layer.

At 408, the UE 402 may determine the modulation orders of the UCIs (e.g., that are multiplexed on a PUSCH). The UCIs may correspond to HARQ-ACK, CSI, and/or other types of UCI-related information. The modulation orders of the UCIs may be a same modulation order or different modulation orders. For example, the first modulation order may correspond to 64 QAM and the second modulation order may correspond to QPSK. Alternatively, both the first modulation order and the second modulation order may correspond to a same modulation order, such as BPSK.

At 410, the UE 402 may map the UCIs to MIMO layers. In a first configuration, the UCIs may be mapped to a same number of MIMO layers, such as one MIMO layer. In a second configuration, the UCIs may be mapped to a different number of MIMO layers, where the first number of MIMO layers may be greater than the second number of MIMO layers. For example, a first UCI may map to 4 MIMO layers and a second UCI may map to 1 MIMO layer.

At 412, the UE 402 may multiplex the UCIs. The UCIs may correspond to a same priority or different priorities. For example, the first UCI of the UCIs may be LP UCI and the second UCI of the UCIs may be HP UCI. At 414, the UE 402 may transmit the multiplexed UCI to the base station 404.

Figure 5:
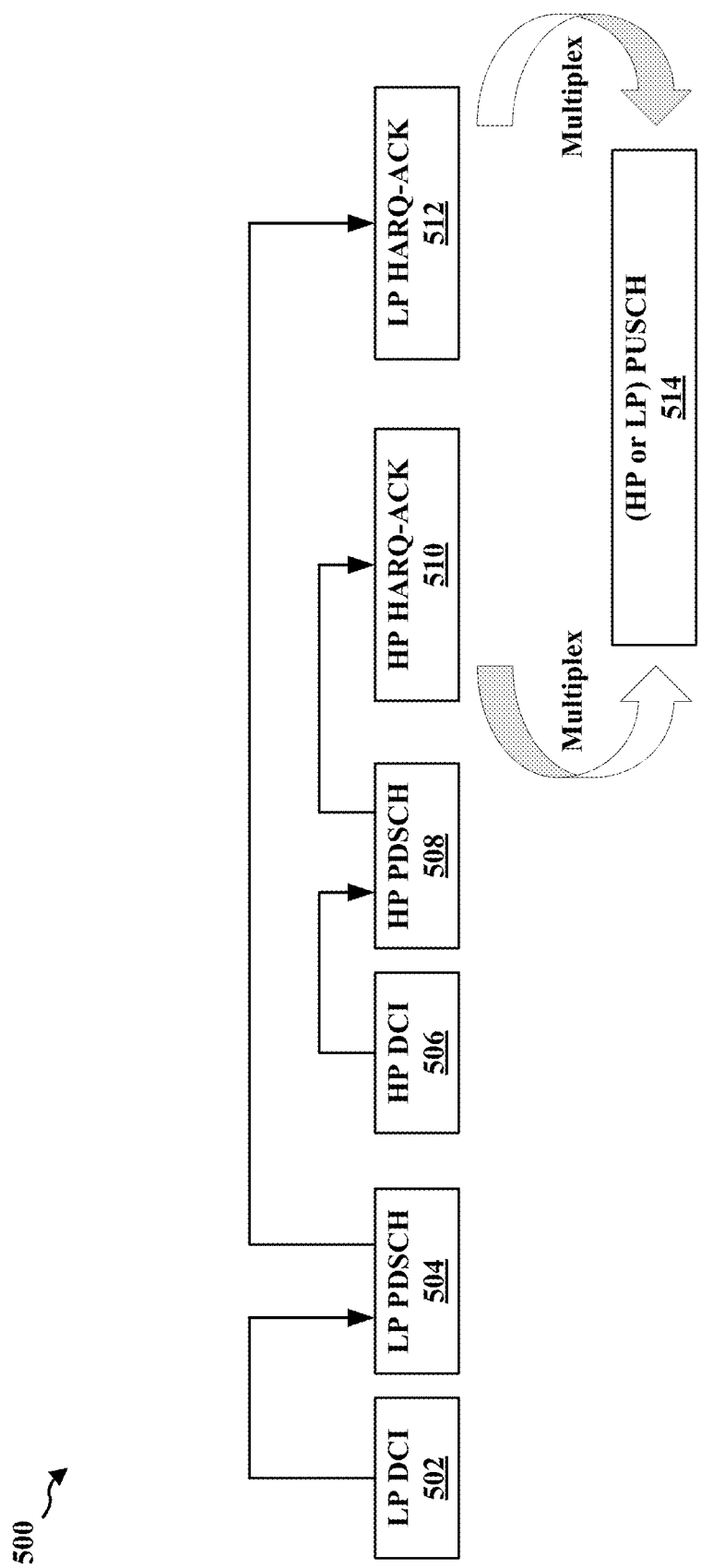
FIG. 5 is a diagram that illustrates multiplexing high priority (HP) uplink control information (UCI) and low priority (LP) UCI.

FIG. 5 is a diagram 500 that illustrates multiplexing HP UCI and LP UCI on a PUSCH 514. That is, a UE may transmit the HP UCI and the LP UCI to a base station at a same time on a same PUSCH 514. While the UCI associated with the diagram 500 may correspond to HARQ-ACK, other types of UCI, such as UCI associated with CSI, may be included in similar multiplexed transmissions. Regardless of the type of UCI, the UE may be configured to multiplex UCIs of different priorities on the same PUSCH 514, where the HP UCI and the LP UCI that are multiplexed on the PUSCH 514 may be based on different modulation orders and/or a different number of MIMO layers.

The PUSCH 514 may be an HP PUSCH or an LP PUSCH based on a priority of the UCI that is included in the PUSCH 514. If the UCI corresponds to HARQ-ACK, the HARQ-ACK may be HP HARQ-ACK 510 and/or LP HARQ-ACK 512. The HP HARQ-ACK 510 may be associated with different downlink traffic than the LP HARQ-ACK 512. For instance, the base station may initially transmit an LP DCI 502 to the UE that schedules an LP PDSCH 504. In response to receiving the LP PDSCH 504, the UE may determine to transmit the LP HARQ-ACK 512 to the base station on an LP PUSCH.

If the base station subsequently determines to transmit an HP DCI 506 to the UE that schedules an HP PDSCH 508 (e.g., based on higher priority traffic, such as URLLC traffic) and the HP PDSCH 508 is received by the UE before the UE transmits the LP HARQ-ACK 512 to the base station, the UE may multiplex the HP HARQ-ACK 510 with the LP HARQ-ACK 512 in the same PUSCH transmission (e.g., the PUSCH 514). In such cases, the multiplexed PUSCH 514 transmitted to the base station may be an HP PUSCH based on the HP HARQ-ACK 510 being included in the PUSCH 514 with the LP HARQ-ACK 512. Accordingly, the LP PUSCH including the LP HARQ-ACK 512 that the UE initially determined to transmit to the base station may be changed to the HP PUSCH including both the HP HARQ-ACK 510 and the LP HARQ-ACK 512.

In some examples, the HP UCI and the LP UCI for different types of UCI (e.g., HARQ-ACK, CSI, etc.) may have a same modulation order. The modulation order may correspond to a modulation order of the PUSCH 514. For example, if the modulation order of the PUSCH 514 corresponds to QPSK, the modulation orders of the UCIs (e.g., HARQ-ACKs, CSIs, etc.) that are multiplexed on the PUSCH 514 may also correspond to QPSK. The HP UCI and the LP UCI for any of the different types of UCI (e.g., HARQ-ACK, CSI, etc.) may be transmitted to the base station based on a same number of MIMO layers. The number of MIMO layers may correspond to the number of MIMO layers of the PUSCH 514. For example, if the PUSCH 514 includes K MIMO layers, the UCIs (e.g., HARQ-ACKs, CSIs, etc.) that are multiplexed on the PUSCH 514 may also include K MIMO layers.

Figure 6:
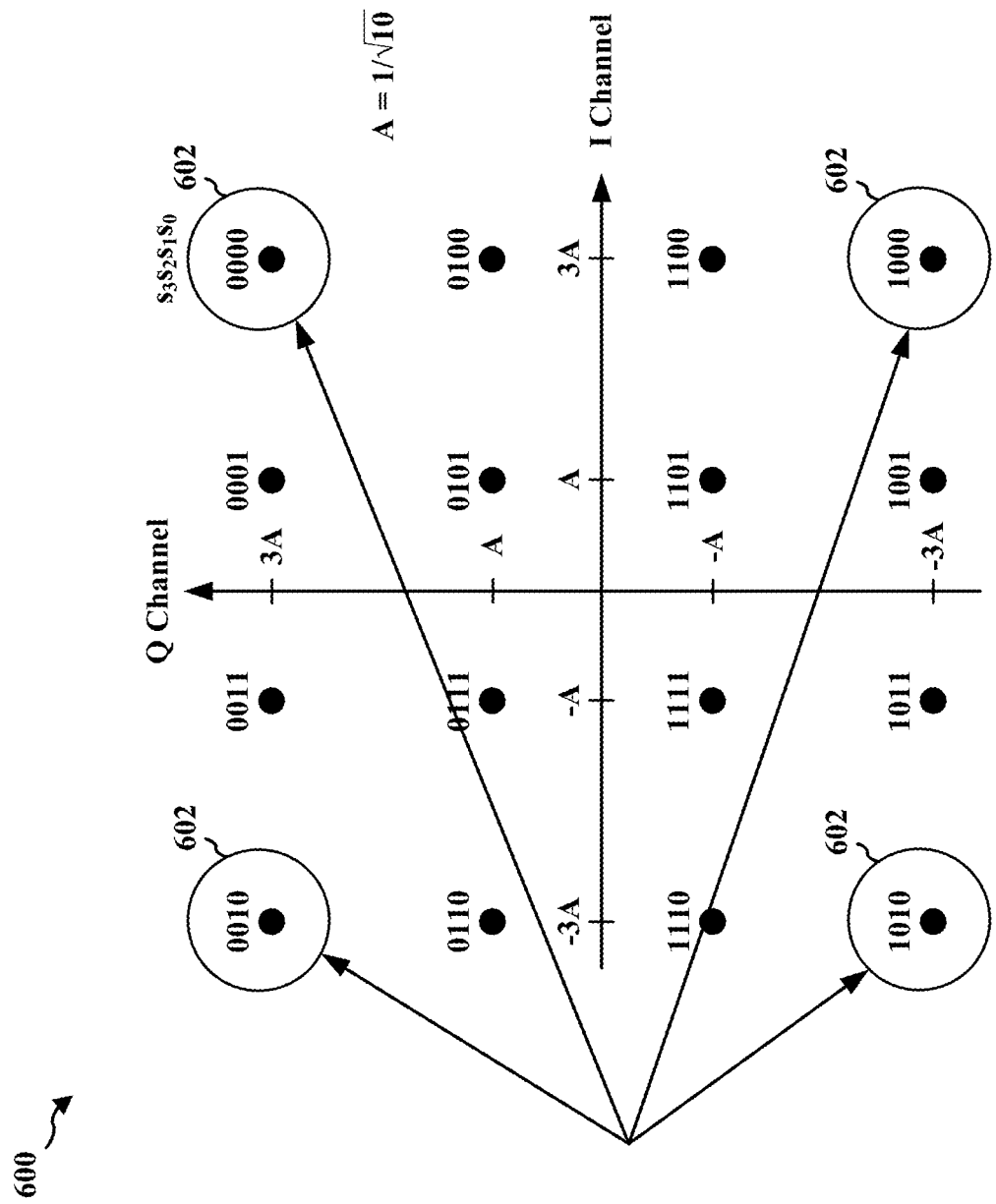
FIG. 6 illustrates a signal constellation diagram.

FIG. 6 illustrates a signal constellation diagram 600 associated with different modulation orders for different priority UCIs that are multiplexed on a PUSCH. For example, the LP UCI may have a same modulation order as a modulation order of the PUSCH, and the HP UCI may have a lower modulation order than the modulation order of the PUSCH and the LP UCI, if possible. Otherwise, the modulation order of the HP UCI may be the same modulation order as the modulation order of the PUSCH and the LP UCI.

The modulation orders for the LP UCI and the HP UCI may include BPSK, QPSK, 16 QAM, 64 QAM, etc., where BPSK may correspond to a lowest modulation order and 64 QAM may correspond to a highest modulation order. As the HP UCI may be based on a higher reliability than the LP UCI, a decreased modulation order for the HP UCI may allow the HP UCI to include the higher reliability. Hence, the modulation order of the LP UCI may be higher than the modulation order for the HP UCI. For instance, the LP UCI may correspond to the same modulation order as the PUSCH and the HP UCI may correspond to a modulation order that is lower than the modulation order of the PUSCH.

The modulation order may be indicated in a scheduling DCI of the PUSCH. In a first example, if the modulation order of the PUSCH is 64 QAM, the modulation order of the LP HARQ-ACK may also be 64 QAM, and the modulation order of the HP HARQ-ACK may be QPSK. In order to determine which lower modulation order (e.g., BPSK, QPSK, or 16 QAM) to use for the HP HARQ-ACK, the base station may signal the lower modulation order to the UE. In a second example, the LP HARQ-ACK and the PUSCH may already be associated with the lowest modulation order. Therefore, the modulation order of the HP HARQ-ACK may be the same modulation order as the modulation order of the LP HARQ-ACK and the PUSCH. For example, if the modulation order of the LP HARQ-ACK and the PUSCH corresponds to BPSK, the modulation order of the HP HARQ-ACK may also correspond to BPSK, as BSPSK may be the lowest modulation order.

In examples, the PUSCH may include a 16 QAM modulation order based on the signal constellation diagram 600. The LP UCI may utilize the same modulation order as the PUSCH (e.g., 16 QAM), but the network may signal the HP UCI to utilize a modulation order, such as QPSK or BPSK, that is lower than the modulation order of the PUSCH based on sharing the same constellation of the diagram 600 used for the higher modulation order. For instance, if a QPSK modulation order is signaled by the network, the constellation points for the QPSK may correspond to the 4 corner points 602 of the signal constellation diagram 600 used for the 16 QAM constellation. Thus, the HP UCI may utilize the corner points 602 from the 16 QAM constellation for the QPSK constellation. The corner points 602 of the 16 QAM constellation may be selected based on a distance between the corner points 602 being at a maximum distance within the 16 QAM constellation. The maximum distance may increase the performance of the QPSK modulation. Accordingly, a constellation map may be provided that includes a nested constellation for the QPSK points within the higher order constellation for the 16 QAM points.

Figure 7:
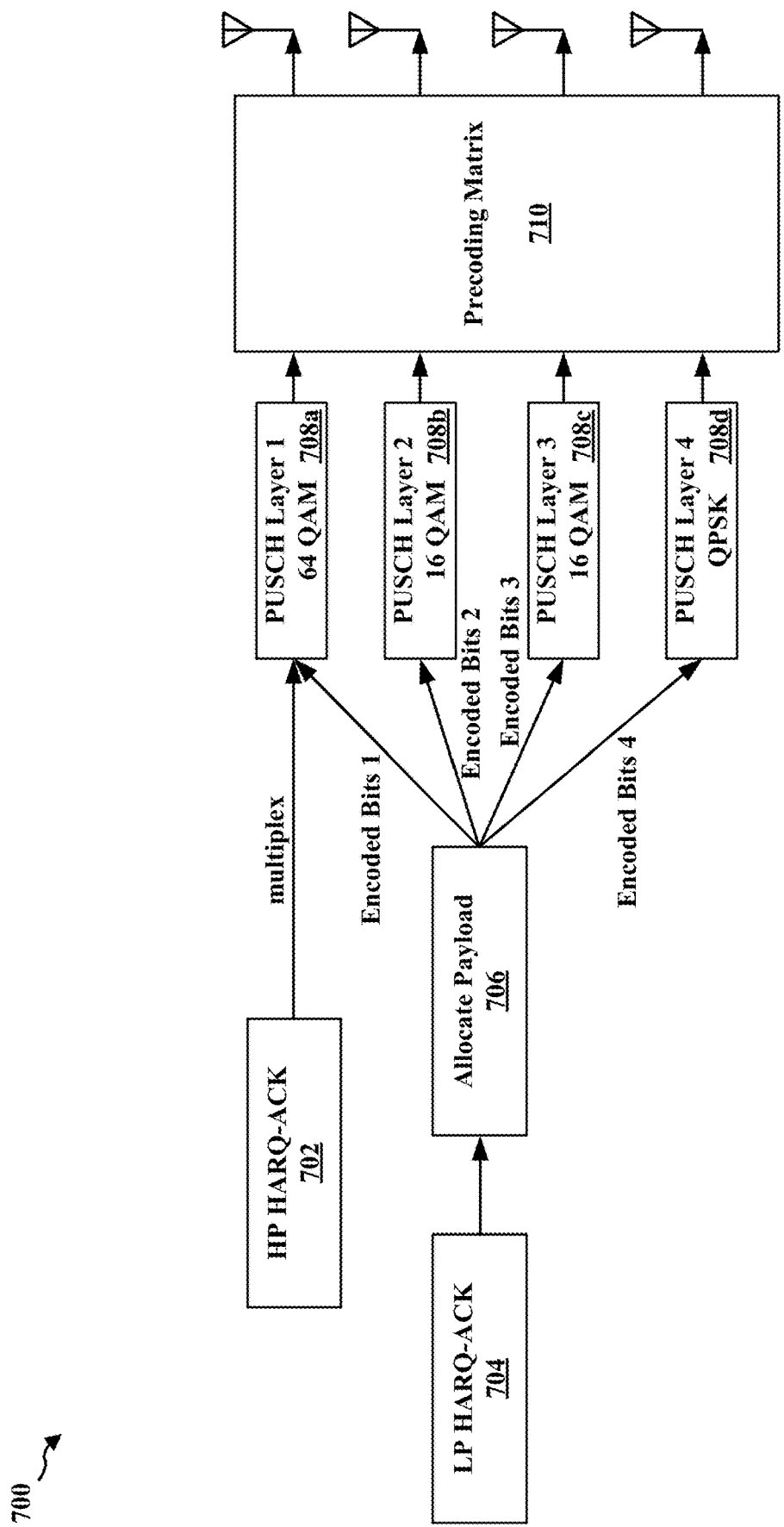
FIG. 7 illustrates a diagram indicative of mappings for HP UCI and LP UCI that include a different number of multiple-input multiple-output (MIMO) layers.
Figure 8:
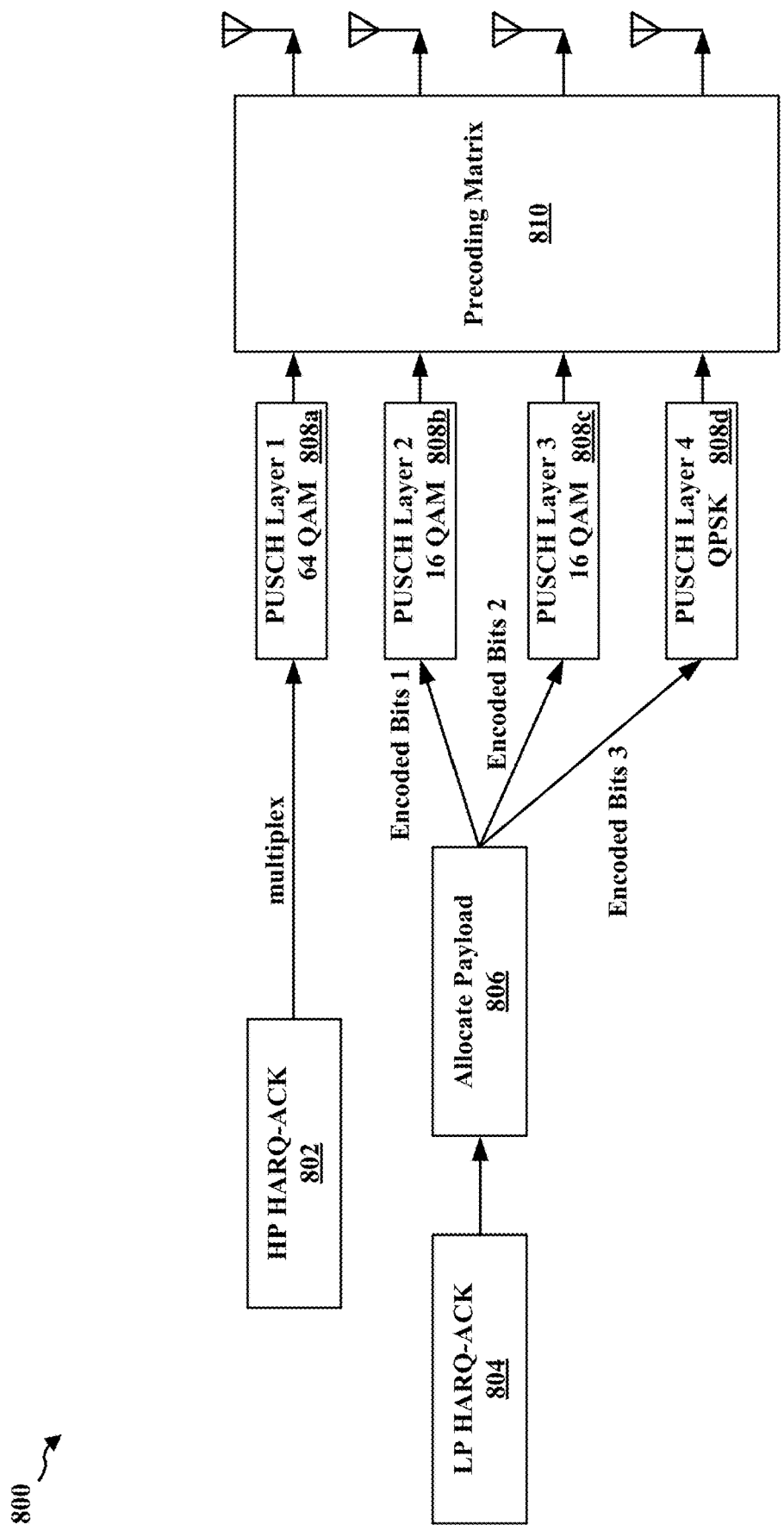
FIG. 8 illustrates a diagram indicative of mappings for HP UCI and LP UCI that include a different number of MIMO layers.

FIGS. 7 and 8 illustrates diagram 700 and diagram 800, respectively, indicative of mappings for LP UCI and HP UCI that include a different number of MIMO layers. The LP UCI may correspond to LP HARQ-ACK 704 or LP HARQ-ACK 804 and may include a first number of MIMO layers (e.g., 3-4 layers), and the HP UCI may correspond to HP HARQ-ACK 702 or HP HARQ-ACK 802 and may include a second number of MIMO layers (e.g., 1 layer). The LP HARQ-ACK 704/804 and the HP HARQ-ACK 702/802 may be multiplexed on a same PUSCH.

In the diagram 700, the first number of layers of the LP HARQ-ACK 704 may be a same number of layers as a number of layers of the PUSCH. That is, the PUSCH and the LP HARQ-ACK 704 may both include the first number of MIMO layers (e.g., K MIMO layers). In the diagram 700, the PUSCH and the LP HARQ-ACK 704 include 4 MIMO layers that correspond to a first layer 708a, a second layer 708b, a third layer 708c, and a fourth layer 708d. The LP HARQ-ACK 704 may include an encoded payload that is allocated, at 706, into a number of encoded bits (e.g., encoded bits 1, encoded bits 2, encoded bits 3, and encoded bits 4) that may be mapped to the layers 708a-708d. The layers 708a-708d may provide the encoded bits to a pre-coding matrix 710. A 4×4 precoding procedure may be performed at the precoding matrix 710 when 4 inputs to the precoding matrix 710 are output to 4 different physical antennas.

While the LP HARQ-ACK 704 may have a same number of MIMO layers (e.g., 4 layers) as a number of MIMO layers of the PUSCH, the HP HARQ-ACK 702 may have a lower number of MIMO layers (e.g., 1 layer) than the number of MIMO layers of the PUSCH and the LP HARQ-ACK 704, if possible. Otherwise, the number of MIMO layers of the HP HARQ-ACK 702 may be the same number of MIMO layers as the number of MIMO layers of the PUSCH and the LP HARQ-ACK 704. For example, if the PUSCH includes a single layer, then both the HP HARQ-ACK 702 and LP HARQ-ACK 704 may be transmitted within the single layer/equal number of layers.

The HP HARQ-ACK 702 may map to the first layer 708a, and solely use the first layer 708a for transmission. After a payload of the HP HARQ-ACK 702 is encoded and the encoded bits of the HP HARQ-ACK 702 are mapped to the first layer 708a, an output of the first layer 708a may be provided to the precoding matrix 710. A 1×4 precoding procedure may be performed at the precoding matrix 710 when 1 MIMO layer/input to the precoding matrix 710 is output to 4 different physical antennas. The LP HARQ-ACK 704 may map to a same number of MIMO layers (e.g., 4 layers) as the number of MIMO layers of the PUSCH. For example, the LP HARQ-ACK 704 may map to the first layer 708a, the second layer 708b, the third layer 708c, and the fourth layer 708d associated with the PUSCH.

If the HP HARQ-ACK 702 is to be mapped to a single MIMO layer, the UE may determine which of the layers 708a-708d is to be used for the mapping. If the layers 708a-708d of the PUSCH use different modulation orders, the HP HARQ-ACK 702 may be mapped to the PUSCH layer that includes the highest modulation order. For example, the first layer 708a (e.g., PUSCH layer 1) may correspond to 64 QAM, the second layer (e.g., PUSCH layer 2) may correspond to 16 QAM, the third layer (e.g., PUSCH layer 3) may also correspond to 16 QAM, and the fourth layer (e.g., PUSCH layer 4) may correspond to QPSK. Thus, the HP HARQ-ACK 702 may be mapped to the first layer 708a, which corresponds to the highest modulation order of the layers 708a-708d illustrated in the diagram 700.

A signal-to-noise ratio (SNR) may be different for the different layers 708a-708d. When the base station allows different modulation orders to be used for the different layers 708a-708d, the base station may use a higher modulation order for a layer that includes a higher SNR. Thus, the higher SNR may be indicative of the higher modulation order. As such, the HP HARQ-ACK 702 may be mapped to the layer that includes the highest SNR, which may be the layer that includes the highest modulation order (e.g., the first layer 708a), for providing the higher reliability for the HP HARQ-ACK 702.

After the HP HARQ-ACK 702 is mapped to the layer with the highest modulation order (e.g., the first layer 708a), the HP HARQ-ACK 702 may utilize a lower modulation order than the modulation order of the first layer 708a (e.g., based on nested constellation points included within a constellation of the higher modulation order, as illustrated in the diagram 600). A reliability of the HP HARQ-ACK 702 may be increased based on using a lower modulation order for the HARQ-ACK 702. Thus, the modulation order of the HP HARQ-ACK 702 may be less than or equal to the modulation order of the first layer 708a to which the HP HARQ-ACK 702 is mapped.

The utilized modulation order for the HP HARQ-ACK 702 may be based on signaling received from the base station. If the base station signals that the HP HARQ-ACK 702 is to use QPSK as the modulation order, then QPSK may be used on the PUSCH layer (e.g., the first layer 708a) to which the HP HARQ-ACK 702 is mapped. The LP HARQ-ACK 704 may be mapped to all of the layers 708a-708d and, unlike for the HP HARQ-ACK 702, the mapping may be independent of the modulation order of the individual PUSCH layers. Hence, the modulation order of the LP HARQ-ACK 704 on the first layer 708a may be 64 QAM.

In the diagram 800, the HP HARQ-ACK 802 may be mapped to a first subset of layers (e.g., a first layer 808a) of the layers 808a-808d, and the LP HARQ-ACK 804 may include an encoded payload that is allocated, at 806, into a number of encoded bits (e.g., encoded bits 1, encoded bits 2, and encoded bits 3) and mapped to a remaining subset of layers (e.g., a second layer 808b, a third layer 808c, and a fourth layer 808d) of the layers 808a-808d, if a remaining subset of layers may exist separately from the first subset of layers. For example, the HP HARQ-ACK 802 may be mapped to the first layer 808a, which may include the highest modulation order (e.g., 64 QAM), where the modulation order of the HP HARQ-ACK 802 may be smaller than the modulation order of the first layer 808a. The LP HARQ-ACK 804 may be mapped to the second layer 808b, the third layer 808c, and the fourth layer 808d (e.g., the remaining subset of layers), but not to the first layer 808a (e.g., the first subset of layers). The layers 808a-808d may provide the encoded bits to a precoding matrix 810. A 4×4 precoding procedure may be performed at the precoding matrix 810 when 4 inputs to the precoding matrix 810 are output to 4 different physical antennas.

The first subset of layers for the HP HARQ-ACK 702/802 and the second subset of layers for the LP HARQ-ACK 704/804 may be two orthogonal subsets of layers. An orthogonal subset of layers refers to layers that do not overlap with each other. If the LP HARQ-ACK 704 is mapped to a same layer (e.g., the first layer 708a) as the HP HARQ-ACK 702, the associated subsets of layers may not be orthogonal to each other. In either case, the number of layers in the first subset of layers corresponding to the mapping of the HP HARQ-ACK 702/802 may be less than the number of layers in the remaining subset of layers corresponding to the mapping of the LP HARQ-ACK 704/804.

Figure 9:
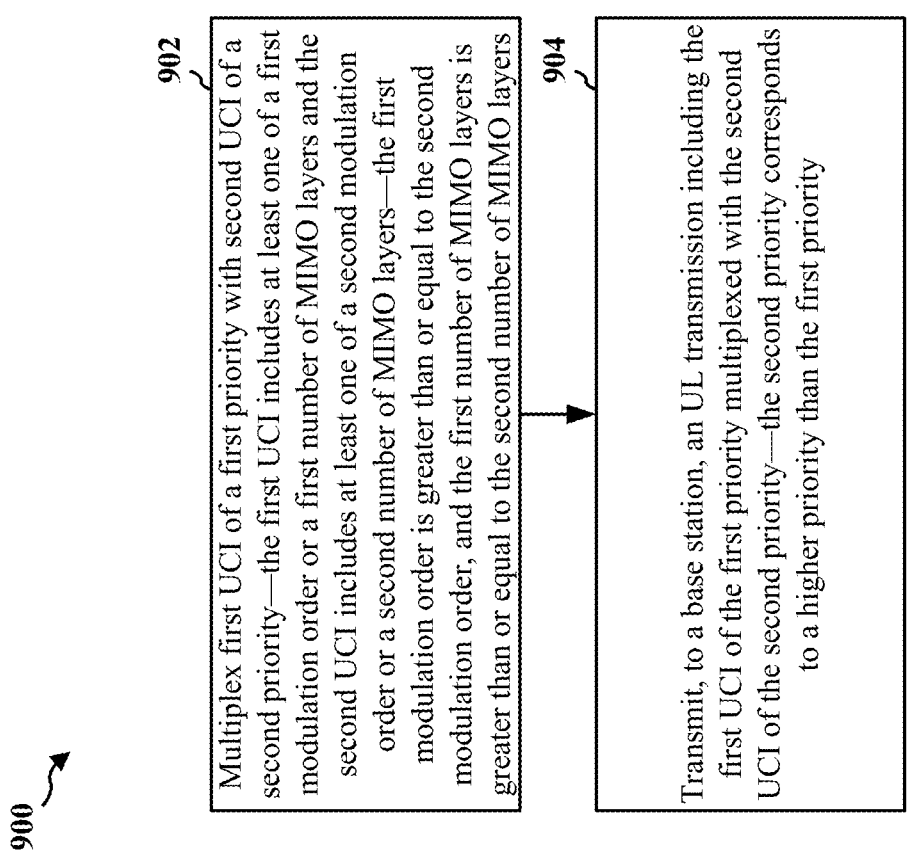
FIG. 9 is a flowchart of a method of wireless communication at a UE.

FIG. 9 is a flowchart 900 of a method of wireless communication. The method may be performed by a UE (e.g., the UE 104/402, the apparatus 1202; etc.), which may include the memory 360 and which may be the entire UE 104/402 or a component of the UE 104/402, such as the TX processor 368, the RX processor 356, and/or the controller/processor 359.

At 902, the UE may multiplex first UCI of a first priority with second UCI of a second priority—the first UCI includes at least one of a first modulation order or a first number of MIMO layers and the second UCI includes at least one of a second modulation order or a second number of MIMO layers—the first modulation order is greater than or equal to the second modulation order, and the first number of MIMO layers is greater than or equal to the second number of MIMO layers. For example, referring to FIGS. 4 and 7, the UE 402 may multiplex, at 412, UCIs of the same or different priorities (e.g., HP UCI and LP UCI). Similarly, the HP HARQ-ACK 702 may be multiplexed with the LP HARQ-ACK 704. The UCIs may have the same or different modulation orders (e.g., determined at 408) or the same or different number of MIMO layers (e.g., associated with the mapping, at 410). For instance, the modulation order of the first layer 708a may be 64 QAM and the modulation order of the HP HARQ-ACK 702 may be less than or equal to 64 QAM. Further, the HP HARQ-ACK 702 may map to the first layer 708a and the LP HARQ-ACK 704 may map to one or more of the layers 708a-708d. The multiplexing, at 902, may be performed by the multiplexer component 1242 of the apparatus 1202 in FIG. 12.

At 904, the UE may transmit, to a base station, an UL transmission including the first UCI of the first priority multiplexed with the second UCI of the second priority—the second priority corresponds to a higher priority than the first priority. For example, referring to FIG. 4, the UE 402 may transmit, at 414, multiplexed UCIs to the base station 404. The UCIs multiplexed, at 412, for transmission, at 414, to the base station 404 may include different priority levels. The transmission, at 904, may be performed by the transmission component 1234 of the apparatus 1202 in FIG. 12.

Figure 10:
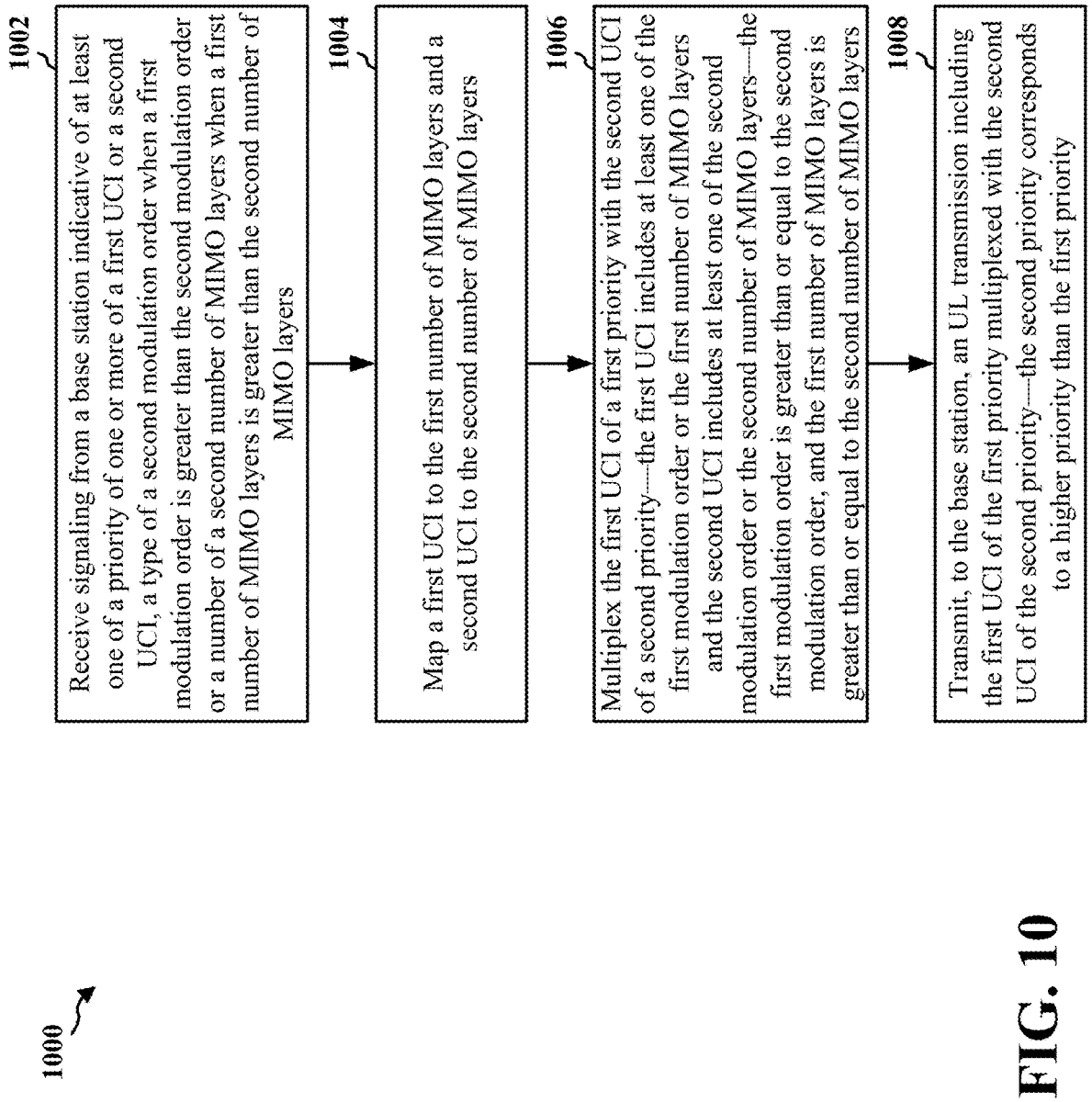
FIG. 10 is a flowchart of a method of wireless communication at a UE.

FIG. 10 is a flowchart 1000 of a method of wireless communication. The method may be performed by a UE (e.g., the UE 104/402, the apparatus 1202; etc.), which may include the memory 360 and which may be the entire UE 104/402 or a component of the UE 104/402, such as the TX processor 368, the RX processor 356, and/or the controller/processor 359.

At 1002, the UE may receive signaling from a base station indicative of at least one of a priority of one or more of a first UCI or a second UCI, a type of a second modulation order when a first modulation order is greater than the second modulation order, or a number of a second number of MIMO layers when a first number of MIMO layers is greater than the second number of MIMO layers. For example, referring to FIG. 4, the UE 402 may receive, at 406, signaled information from the base station 404. The signaled information received, at 406, may include a priority indicator for one or more of the first priority of the first UCI (e.g., LP HARQ-ACK) or the second priority of the second UCI (e.g., HP HARQ-ACK). The priority indicator may be included in at least one of DCI that schedules a PDSCH associated with the one or more of the first UCI or the second UCI (e.g., a HARQ-ACK associated with the PDSCH), or an RRC configuration of the one or more of the first UCI or the second UCI (e.g., periodic CSI feedback). The first priority (e.g., LP) may be indicated by the priority indicator based on a value of 0, and the second priority (e.g., HP) may be indicated by the priority indicator based on a value of 1. The signaled information received, at 406, may also be indicate a type of modulation and/or a number of MIMO layers. For instance, if a first modulation order, such as 64 QAM, is to be greater than a second modulation order, the signaled information received, at 406, may indicate whether the second modulation order is to be 16 QAM, QPSK, or BPSK. If a first number of layers, such as 4 layers, is to be greater than a second number of layers, the signaled information received, at 406, may also indicate whether the second number of layers is to be 3 layers, 2 layers, or 1 layer. The reception, at 1002, may be performed by the reception component 1230 of the apparatus 1202 in FIG. 12.

At 1004, the UE may map a first UCI to the first number of MIMO layers and a second UCI to the second number of MIMO layers. For example, referring to FIGS. 4 and 7, the UE 402 may map, at 410, UCIs to a same or different number of MIMO layers. The first number of MIMO layers (e.g., 4 layers) may correspond to a first set of MIMO layers (e.g., all of the layers 708a-708d) and the second number of MIMO layers (e.g., 1 layer) may correspond to a second set of MIMO layers (e.g., the first layer 708a), where the second set of MIMO layers (e.g., the first layer 708a) is included in the first set of MIMO layers (e.g., all of the layers 708a-708d). Alternatively, the first number of MIMO layers (e.g., 3 layers) may correspond to a first set of MIMO layers (e.g., the second layer 708b, the third layer 708c, and the fourth layer 708d) and the second number of MIMO layers (e.g., 1 layer) may correspond to a second set of MIMO layers (e.g., the first layer 708a), where the first set of MIMO layers (e.g., the second layer 708b, the third layer 708c, and the fourth layer 708d) is a separate set of MIMO layers from the second set of MIMO layers (e.g., the first layer 708a). The second UCI (e.g., HP HARQ-ACK 702) may be mapped to a single MIMO layer (e.g., the first layer 708a) corresponding to the second number of MIMO layers (e.g., 1 layer). A set of MIMO layers associated with the mapping of the first UCI (e.g., LP HARQ-ACK 704) and the second UCI (e.g., HP HARQ-ACK 702) may include different modulation orders, where the second UCI (e.g., HP HARQ-ACK 702) may be mapped to at least one MIMO layer that corresponds to a highest modulation order (e.g., the first layer 708a based on 64 QAM) of the different modulation orders for the set of MIMO layers. The second modulation order of the second UCI (e.g., HP HARQ-ACK 702) may be less than or equal to the highest modulation order (e.g., 64 QAM) of the different modulation orders for the set of MIMO layers. The mapping, at 1004, may be performed by the mapper component 1240 of the apparatus 1202 in FIG. 12.

At 1006, the UE may multiplex the first UCI of a first priority with the second UCI of a second priority—the first UCI includes at least one of the first modulation order or the first number of MIMO layers and the second UCI includes at least one of the second modulation order or the second number of MIMO layers—the first modulation order is greater than or equal to the second modulation order, and the first number of MIMO layers is greater than or equal to the second number of MIMO layers. For example, referring to FIGS. 4 and 7, the UE 402 may multiplex, at 412, UCIs of the same or different priorities (e.g., HP UCI and LP UCI). Similarly, the HP HARQ-ACK 702 may be multiplexed with the LP HARQ-ACK 704. The UCIs may have the same or different modulation orders (e.g., determined at 408) or the same or different number of MIMO layers (e.g., associated with the mapping, at 410). For instance, the modulation order of the first layer 708a may be 64 QAM and the modulation order of the HP HARQ-ACK 702 may be less than or equal to 64 QAM. Further, the HP HARQ-ACK 702 may map to the first layer 708a and the LP HARQ-ACK 704 may map to one or more of the layers 708a-708d. The multiplexing, at 1006, may be performed by the multiplexer component 1242 of the apparatus 1202 in FIG. 12.

Referring still to FIG. 7, at least one of the first UCI (e.g., LP HARQ-ACK 704) or the second UCI (e.g., HP HARQ-ACK 702) may be multiplexed on a PUSCH. The first modulation order of the first UCI (e.g., e.g., 64 QAM) may be a same modulation order as a modulation order of the PUSCH, and the second modulation order of the second UCI (e.g., BPSK, QPSK, or 16 QAM) may be a lower modulation order than the modulation order of the PUSCH. In further examples, the first modulation order of the first UCI and the second modulation order of the second UCI may be a same modulation order as a modulation order of the PUSCH when the first modulation order of the first UCI corresponds to a lowest modulation order (e.g., BPSK) of a set of modulation orders. The first number of MIMO layers of the first UCI (e.g., 4 layers) may be a same number of MIMO layers as a number of MIMO layers of the PUSCH, and the second number of MIMO layers of the second UCI (e.g., 1 layer) may be a lower number of MIMO layers than the number of MIMO layers of the PUSCH. In further examples, the first number of MIMO layers of the first UCI and the second number of MIMO layers of the second UCI may be a same number of MIMO layers (e.g., 1 layer) as a number of MIMO layers of the PUSCH when the first number of MIMO layers is equal to one MIMO layer.

At 1008, the UE may transmit, to the base station, an UL transmission including the first UCI of the first priority multiplexed with the second UCI of the second priority—the second priority corresponds to a higher priority than the first priority. For example, referring to FIG. 4, the UE 402 may transmit, at 414, multiplexed UCIs to the base station 404. The UCIs multiplexed, at 412, for transmission, at 414, to the base station 404 may include different priority levels. The transmission, at 1008, may be performed by the transmission component 1234 of the apparatus 1202 in FIG. 12.

Figure 11:
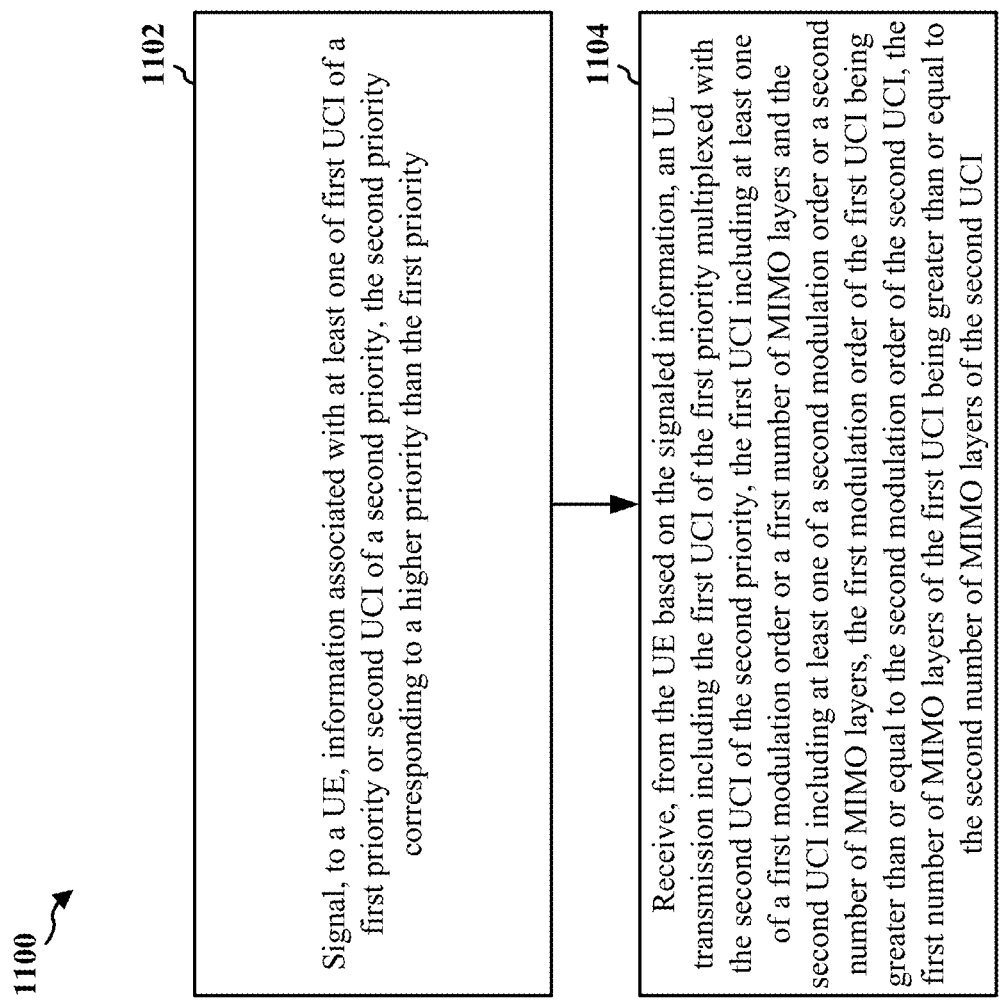
FIG. 11 is a flowchart of a method of wireless communication at a base station.

FIG. 11 is a flowchart 1100 of a method of wireless communication. The method may be performed by a network node or a base station (e.g., the base station 102/404, the apparatus 1302; etc.), which may include the memory 376 and which may be the entire base station 102/404 or a component of the base station 102/404, such as the TX processor 316, the RX processor 370, and/or the controller/processor 375.

At 1102, the network node or base station may signal, to a UE, information associated with at least one of first UCI of a first priority or second UCI of a second priority, the second priority corresponding to a higher priority than the first priority. For example, referring to FIG. 4, the base station may signal, at 406, information to the UE 402. The information signaled, at 406, may include a priority indicator for one or more of the first priority of the first UCI (e.g., LP HARQ-ACK) or the second priority of the second UCI (e.g., HP HARQ-ACK). The priority indicator may be included in at least one of DCI that schedules a PDSCH associated with the one or more of the first UCI or the second UCI (e.g., a HARQ-ACK associated with the PDSCH), or an RRC configuration of the one or more of the first UCI or the second UCI (e.g., periodic CSI feedback). The first priority (e.g., LP) may be indicated by the priority indicator based on a value of 0, and the second priority (e.g., HP) may be indicated by the priority indicator based on a value of 1. The information signaled, at 406, may also indicate a type of modulation and/or a number of MIMO layers. For instance, if a first modulation order, such as 64 QAM, is to be greater than a second modulation order, the information signaled, at 406, may indicate whether the second modulation order is to be 16 QAM, QPSK, or BPSK. If a first number of layers, such as 4 layers, is to be greater than a second number of layers, the information signaled, at 406, may indicate whether the second number of layers is to be 3 layers, 2 layers, or 1 layer. The signaling, at 1102, may be performed by the multiplexed UCI component 1340 of the apparatus 1302 in FIG. 13.

At 1104, the network node or base station may receive, from the UE based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI. For example, referring to FIGS. 4 and 7, the base station 404 may receive, at 414, multiplexed UCIs from the UE 402. Similarly, the HP HARQ-ACK 702 may be multiplexed with the LP HARQ-ACK 704. The multiplex UCIs received, at 414, may be of the same or different priorities (e.g., HP UCI and LP UCI). The UCIs may have the same or different modulation orders (e.g., determined at 408) or the same or different number of MIMO layers (e.g., associated with the mapping, at 410). For instance, the modulation order of the first layer 708a may be 64 QAM and the modulation order of the HP HARQ-ACK 702 may be less than or equal to 64 QAM. Further, the HP HARQ-ACK 702 may map to the first layer 708a and the LP HARQ-ACK 704 may map to one or more of the layers 708a-708d. The reception, at 1104, may be performed by the multiplexed UCI component 1340 of the apparatus 1302 in FIG. 13.

Referring still to FIG. 7, at least one of the first UCI (e.g., LP HARQ-ACK 704) or the second UCI (e.g., HP HARQ-ACK 702) may be multiplexed on a PUSCH. The first modulation order of the first UCI (e.g., e.g., 64 QAM) may be a same modulation order as a modulation order of the PUSCH, and the second modulation order of the second UCI (e.g., BPSK, QPSK, or 16 QAM) may be a lower modulation order than the modulation order of the PUSCH. In further examples, the first modulation order of the first UCI and the second modulation order of the second UCI may be a same modulation order as a modulation order of the PUSCH when the first modulation order of the first UCI corresponds to a lowest modulation order (e.g., BPSK) of a set of modulation orders. The first number of MIMO layers of the first UCI (e.g., 4 layers) may be a same number of MIMO layers as a number of MIMO layers of the PUSCH, and the second number of MIMO layers of the second UCI (e.g., 1 layer) may be a lower number of MIMO layers than the number of MIMO layers of the PUSCH. In further examples, the first number of MIMO layers of the first UCI and the second number of MIMO layers of the second UCI may be a same number of MIMO layers (e.g., 1 layer) as a number of MIMO layers of the PUSCH when the first number of MIMO layers is equal to one MIMO layer.

Further referring to FIG. 7, the first UCI (e.g., LP HARQ-ACK 704) may be mapped to the first number of MIMO layers (e.g., associated with the layers 708a-708d), and the second UCI (e.g., HP HARQ-ACK 702) may be mapped to the second number of MIMO layers (e.g., associated with the layers 708a-708d). The first number of MIMO layers (e.g., 4 layers) may correspond to a first set of MIMO layers (e.g., all of the layers 708a-708d) and the second number of MIMO layers (e.g., 1 layer) may correspond to a second set of MIMO layers (e.g., the first layer 708a), where the second set of MIMO layers (e.g., the first layer 708a) is included in the first set of MIMO layers (e.g., all of the layers 708a-708d). Alternatively, the first number of MIMO layers (e.g., 3 layers) may correspond to a first set of MIMO layers (e.g., the second layer 708b, the third layer 708c, and the fourth layer 708d) and the second number of MIMO layers (e.g., 1 layer) may correspond to a second set of MIMO layers (e.g., the first layer 708a), where the first set of MIMO layers (e.g., the second layer 708b, the third layer 708c, and the fourth layer 708d) is a separate set of MIMO layers from the second set of MIMO layers (e.g., the first layer 708a). The second UCI (e.g., HP HARQ-ACK 702) may be mapped to a single MIMO layer (e.g., the first layer 708a) corresponding to the second number of MIMO layers (e.g., 1 layer). A set of MIMO layers associated with the mapping of the first UCI (e.g., LP HARQ-ACK 704) and the second UCI (e.g., HP HARQ-ACK 702) may include different modulation orders, where the second UCI (e.g., HP HARQ-ACK 702) may be mapped to at least one MIMO layer that corresponds to a highest modulation order (e.g., the first layer 708a based on 64 QAM) of the different modulation orders for the set of MIMO layers. The second modulation order of the second UCI (e.g., HP HARQ-ACK 702) may be less than or equal to the highest modulation order (e.g., 64 QAM) of the different modulation orders for the set of MIMO layers.

Figure 12:
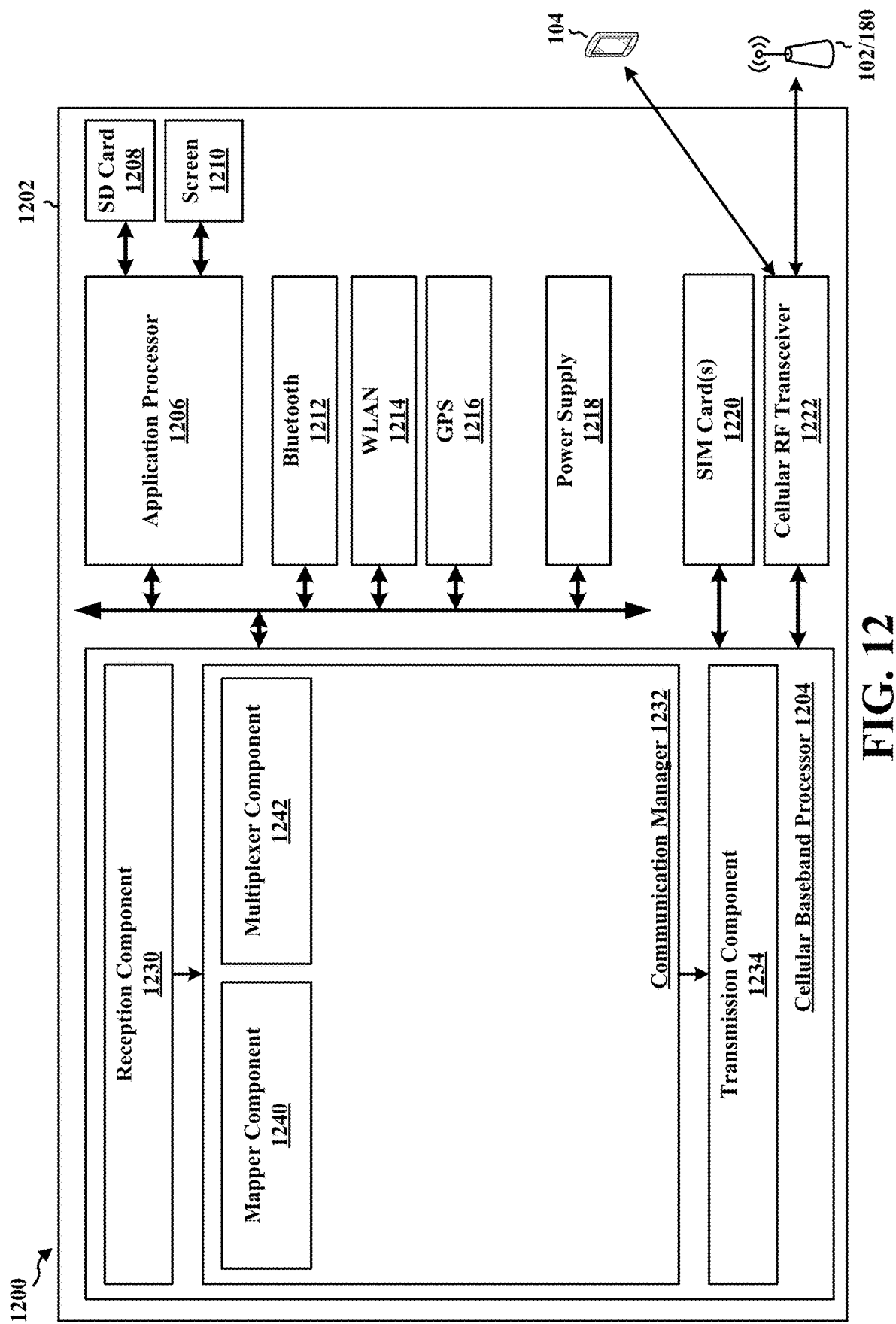
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/ memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a mapper component 1240 that is configured, e.g., as described in connection with 1004, to map a first UCI to the first number of MIMO layers and a second UCI to the second number of MIMO layers. The communication manager 1232 further includes a multiplexer component 1242 that is configured, e.g., as described in connection with 902 and 1006, to multiplex the first UCI of a first priority with the second UCI of a second priority—the first UCI includes at least one of the first modulation order or the first number of MIMO layers and the second UCI includes at least one of the second modulation order or the second number of MIMO layers— the first modulation order is greater than or equal to the second modulation order, and the first number of MIMO layers is greater than or equal to the second number of MIMO layers.

The reception component 1230 is configured, e.g., as described in connection with 1002, to receive signaling from a base station indicative of at least one of a priority of one or more of a first UCI or a second UCI, a type of a second modulation order when a first modulation order is greater than the second modulation order, or a number of a second number of MIMO layers when a first number of MIMO layers is greater than the second number of MIMO layers. The transmission component 1234 is configured, e.g., as described in connection with 904 and 1008, to transmit, to the base station, an UL transmission including the first UCI of the first priority multiplexed with the second UCI of the second priority—the second priority corresponds to a higher priority than the first priority.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for multiplexing first UCI of a first priority with second UCI of a second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and means for transmitting, to a base station, an UL transmission including the first UCI of the first priority multiplexed with the second UCI of the second priority, the second priority corresponding to a higher priority than the first priority. The apparatus 1202 further includes means for receiving signaling from the base station indicative of at least one of a type of the second modulation order when the first modulation order is greater than the second modulation order or a number of the second number of MIMO layers when the first number of MIMO layers is greater than the second number of MIMO layers. The apparatus 1202 further includes means for mapping the first UCI to the first number of MIMO layers and the second UCI to the second number of MIMO layers.

The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
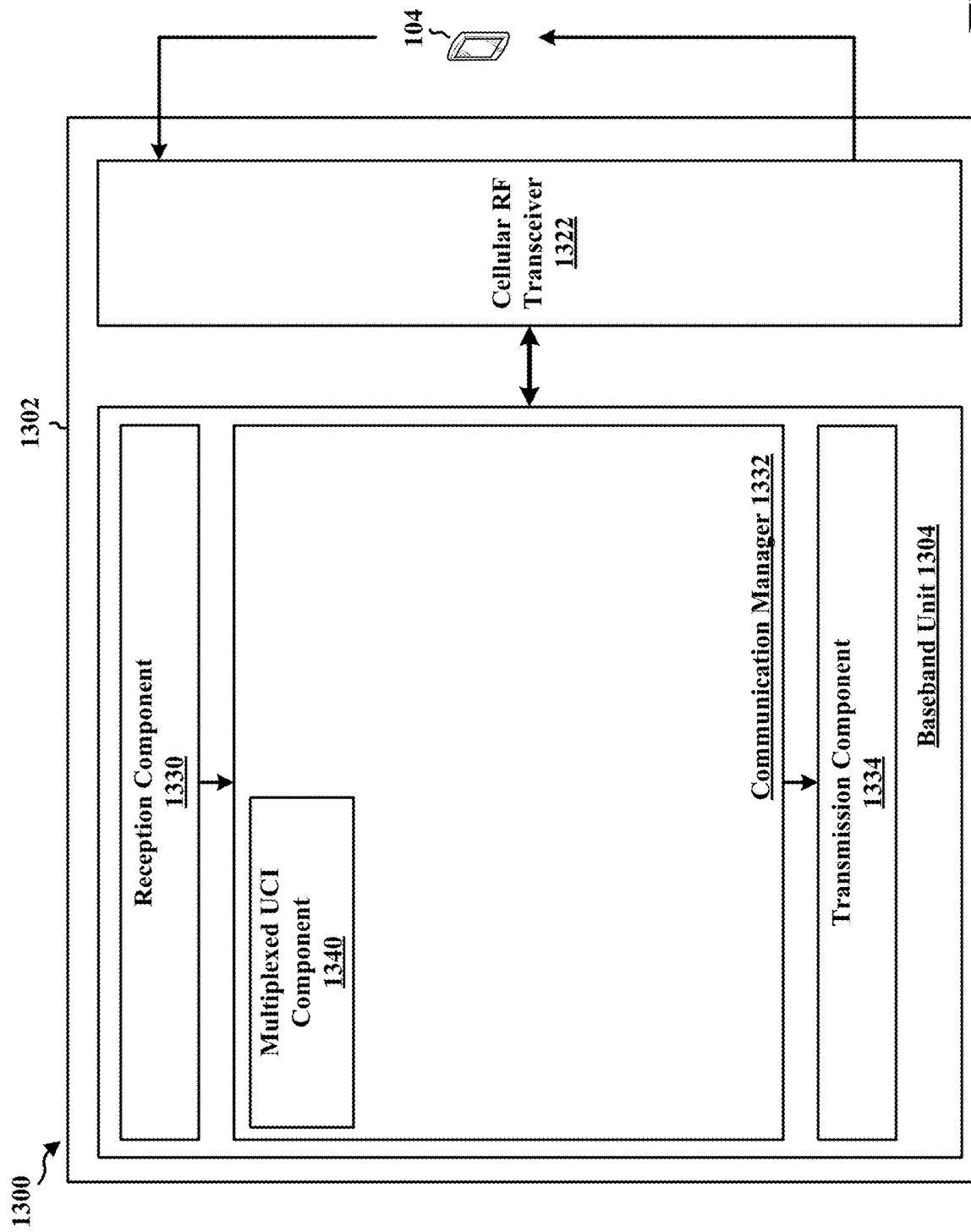
FIG. 13 is a diagram illustrating an example of a hardware implementation for an example apparatus.

FIG. 13 is a diagram 1300 illustrating an example of a hardware implementation for an apparatus 1302. The apparatus 1302 may be a network node or base station, a component of a network node or base station, or may implement base station functionality. In some aspects, the apparatus 1302 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 includes a multiplexed UCI component 1340 that is configured, e.g., as described in connection with 1102 and 1104, to signal, to a UE, information associated with at least one of first UCI of a first priority or second UCI of a second priority, the second priority corresponding to a higher priority than the first priority; and to receive, from the UE based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

The apparatus may include additional components that perform each of the blocks of the algorithm in the flowchart of FIG. 11. As such, each block in the flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, includes means for signaling, to a UE, information associated with at least one of first UCI of a first priority or second UCI of a second priority, the second priority corresponding to a higher priority than the first priority; and means for receiving, from the UE based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE including at least one processor coupled to a memory and configured to multiplex first UCI of a first priority with second UCI of a second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and transmit, to a network node, an UL transmission including the first UCI of the first priority multiplexed with the second UCI of the second priority, the second priority corresponding to a higher priority than the first priority.

Aspect 2 may be combined with aspect 1 and includes that one or more of the first priority of the first UCI or the second priority of the second UCI is based on a priority indicator included in at least one of DCI that schedules a PDSCH associated with one or more of the first UCI or the second UCI, or a RRC configuration of the one or more of the first UCI or the second UCI.

Aspect 3 may be combined with any of aspects 1-2 and includes that the first priority is indicated by the priority indicator based on a value of 0, and includes that the second priority is indicated by the priority indicator based on a value of 1.

Aspect 4 may be combined with any of aspects 1-3 and includes that at least one of the first UCI or the second UCI is multiplexed on a PUSCH, the first modulation order of the first UCI being a same modulation order as a modulation order of the PUSCH, the second modulation order of the second UCI being a lower modulation order than the modulation order of the PUSCH.

Aspect 5 may be combined with any of aspects 1-3 and includes that at least one of the first UCI or the second UCI is multiplexed on a PUSCH, the first modulation order of the first UCI and the second modulation order of the second UCI being a same modulation order as a modulation order of the PUSCH when the first modulation order of the first UCI corresponds to a lowest modulation order of a set of modulation orders.

Aspect 6 may be combined with any of aspects 1-5 and includes that at least one of the first UCI or the second UCI is multiplexed on a PUSCH, the first number of MIMO layers of the first UCI being a same number of MIMO layers as a number of MIMO layers of the PUSCH, the second number of MIMO layers of the second UCI being a lower number of MIMO layers than the number of MIMO layers of the PUSCH.

Aspect 7 may be combined with any of aspects 1-4 and includes that at least one of the first UCI or the second UCI is multiplexed on a PUSCH, the first number of MIMO layers of the first UCI and the second number of MIMO layers of the second UCI being a same number of MIMO layers as a number of MIMO layers of the PUSCH when the first number of MIMO layers is equal to one MIMO layer.

Aspect 8 may be combined with any of aspects 1-4 or 6 and includes that the at least one processor is further configured to receive signaling from the network node indicative of at least one of a type of the second modulation order when the first modulation order is greater than the second modulation order or a number of the second number of MIMO layers when the first number of MIMO layers is greater than the second number of MIMO layers.

Aspect 9 may be combined with any of aspects 1-8 and includes that the at least one processor is further configured to map the first UCI to the first number of MIMO layers and the second UCI to the second number of MIMO layers.

Aspect 10 may be combined with any of aspects 1-9 and includes that the first number of MIMO layers corresponds to a first set of MIMO layers and the second number of MIMO layers corresponds to a second set of MIMO layers, the second set of MIMO layers being included in the first set of MIMO layers.

Aspect 11 may be combined with any of aspects 1-9 and includes that the first number of MIMO layers corresponds to a first set of MIMO layers and the second number of MIMO layers corresponds to a second set of MIMO layers, the first set of MIMO layers being a separate set of MIMO layers from the second set of MIMO layers.

Aspect 12 may be combined with any of aspects 1-11 and includes that the second UCI is mapped to a single MIMO layer corresponding to the second number of MIMO layers.

Aspect 13 may be combined with any of aspects 1-12 and includes that a set of MIMO layers associated with the mapping of the first UCI and the second UCI includes different modulation orders, the second UCI being mapped to at least one MIMO layer that corresponds to a highest modulation order of the different modulation orders for the set of MIMO layers.

Aspect 14 may be combined with any of aspects 1-13 and includes that the second modulation order of the second UCI is less than or equal to the highest modulation order of the different modulation orders for the set of MIMO layers.

Aspect 15 may be combined with any of aspects 1-14 and further includes at least one of a transceiver or an antenna coupled to the at least one processor.

Aspect 16 is an apparatus for wireless communication at a network node including at least one processor coupled to a memory and configured to signal information associated with at least one of first UCI of a first priority or second UCI of a second priority, the second priority corresponding to a higher priority than the first priority; and receive, based on the signaled information, an UL transmission including the first UCI of the first priority multiplexed with the second UCI of the second priority, the first UCI including at least one of a first modulation order or a first number of MIMO layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

Aspect 17 may be combined with aspect 16 and includes that one or more of the first priority of the first UCI or the second priority of the second UCI is based on a priority indicator included in at least one of DCI that schedules a PDSCH associated with one or more of the first UCI or the second UCI, or a RRC configuration of the one or more of the first UCI or the second UCI.

Aspect 18 may be combined with any of aspects 16-17 and includes that the first priority is indicated by the priority indicator based on a value of 0, and includes that the second priority is indicated by the priority indicator based on a value of 1.

Aspect 19 may be combined with any of aspects 16-18 and includes that at least one of the first UCI or the second UCI is multiplexed on a PUSCH, the first modulation order of the first UCI being a same modulation order as a modulation order of the PUSCH, the second modulation order of the second UCI being a lower modulation order than the modulation order of the PUSCH.

Aspect 20 may be combined with any of aspects 16-18 and includes that at least one of the first UCI or the second UCI is multiplexed on a PUSCH, the first modulation order of the first UCI and the second modulation order of the second UCI being a same modulation order as a modulation order of the PUSCH when the first modulation order of the first UCI corresponds to a lowest modulation order of a set of modulation orders.

Aspect 21 may be combined with any of aspects 16-20 and includes that at least one of the first UCI or the second UCI is multiplexed on a PUSCH, the first number of MIMO layers of the first UCI being a same number of MIMO layers as a number of MIMO layers of the PUSCH, the second number of MIMO layers of the second UCI being a lower number of MIMO layers than the number of MIMO layers of the PUSCH.

Aspect 22 may be combined with any of aspects 16-19 and includes that at least one of the first UCI or the second UCI is multiplexed on a PUSCH, the first number of MIMO layers of the first UCI and the second number of MIMO layers of the second UCI being a same number of MIMO layers as a number of MIMO layers of the PUSCH when the first number of MIMO layers is equal to one MIMO layer.

Aspect 23 may be combined with any of aspects 16-19 or 21 and includes that at least one of a type of the second modulation order or a number of the second number of MIMO layers is included in the information in association with at least one of the first modulation order being greater than the second modulation order or the first number of MIMO layers being greater than the second number of MIMO layers.

Aspect 24 may be combined with any of aspects 16-23 and includes that the first UCI is mapped to the first number of MIMO layers and the second UCI is mapped to the second number of MIMO layers.

Aspect 25 may be combined with any of aspects 16-24 and includes that the first number of MIMO layers corresponds to a first set of MIMO layers and the second number of MIMO layers corresponds to a second set of MIMO layers, the second set of MIMO layers being included in the first set of MIMO layers.

Aspect 26 may be combined with any of aspects 16-24 and includes that the first number of MIMO layers corresponds to a first set of MIMO layers and the second number of MIMO layers corresponds to a second set of MIMO layers, the first set of MIMO layers being a separate set of MIMO layers from the second set of MIMO layers.

Aspect 27 may be combined with any of aspects 16-26 and includes that the second UCI is mapped to a single MIMO layer corresponding to the second number of MIMO layers.

Aspect 28 may be combined with any of aspects 16-27 and includes that a set of MIMO layers associated with the mapping of the first UCI and the second UCI includes different modulation orders, the second UCI being mapped to at least one MIMO layer that corresponds to a highest modulation order of the different modulation orders for the set of MIMO layers.

Aspect 29 may be combined with any of aspects 16-28 and includes that the second modulation order of the second UCI is less than or equal to the highest modulation order of the different modulation orders for the set of MIMO layers.

Aspect 30 may be combined with any of aspects 16-29 and further includes at least one of a transceiver or an antenna coupled to the at least one processor.

Aspect 31 is a method of wireless communication for implementing any of aspects 1-30.

Aspect 32 is an apparatus for wireless communication including means for implementing any of aspects 1-30.

Aspect 33 is a non-transitory computer-readable medium storing computer executable code, the code when executed by at least one processor causes the at least one processor to implement any of aspects 1-30.

What is claimed is:

1. An apparatus for wireless communication at a user equipment (UE), comprising:
   a memory; and
   at least one processor coupled to the memory and configured to:
      multiplex first uplink control information (UCI) of a first priority with second UCI of a second priority, the first UCI including at least one of a first modulation order or a first number of multiple-input multiple-output (MIMO) layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and
      transmit, to a network node, an uplink (UL) transmission including the first UCI of the first priority multiplexed with the second UCI of the second priority, the second priority corresponding to a higher priority than the first priority.

2. The apparatus of claim 1, wherein one or more of the first priority of the first UCI or the second priority of the second UCI is based on a priority indicator included in at least one of downlink control information (DCI) that schedules a physical downlink shared channel (PDSCH) associated with one or more of the first UCI or the second UCI, or a radio resource control (RRC) configuration of the one or more of the first UCI or the second UCI.

3. The apparatus of claim 2, wherein the first priority is indicated by the priority indicator based on a value of 0, and wherein the second priority is indicated by the priority indicator based on a value of 1.

4. The apparatus of claim 1, wherein at least one of the first UCI or the second UCI is multiplexed on a physical uplink shared channel (PUSCH), the first modulation order of the first UCI being a same modulation order as a modulation order of the PUSCH, the second modulation order of the second UCI being a lower modulation order than the modulation order of the PUSCH.

5. The apparatus of claim 1, wherein at least one of the first UCI or the second UCI is multiplexed on a physical uplink shared channel (PUSCH), the first modulation order of the first UCI and the second modulation order of the second UCI being a same modulation order as a modulation order of the PUSCH when the first modulation order of the first UCI corresponds to a lowest modulation order of a set of modulation orders.

6. The apparatus of claim 1, wherein at least one of the first UCI or the second UCI is multiplexed on a physical uplink shared channel (PUSCH), the first number of MIMO layers of the first UCI being a same number of MIMO layers as a number of MIMO layers of the PUSCH, the second number of MIMO layers of the second UCI being a lower number of MIMO layers than the number of MIMO layers of the PUSCH.

7. The apparatus of claim 1, wherein at least one of the first UCI or the second UCI is multiplexed on a physical uplink shared channel (PUSCH), the first number of MIMO layers of the first UCI and the second number of MIMO layers of the second UCI being a same number of MIMO layers as a number of MIMO layers of the PUSCH when the first number of MIMO layers is equal to one MIMO layer.

8. The apparatus of claim 1, wherein the at least one processor is further configured to receive signaling from the network node indicative of at least one of a type of the second modulation order when the first modulation order is greater than the second modulation order or a number of the second number of MIMO layers when the first number of MIMO layers is greater than the second number of MIMO layers.

9. The apparatus of claim 1, wherein the at least one processor is further configured to map the first UCI to the first number of MIMO layers and the second UCI to the second number of MIMO layers.

10. The apparatus of claim 9, wherein the first number of MIMO layers corresponds to a first set of MIMO layers and the second number of MIMO layers corresponds to a second set of MIMO layers, the second set of MIMO layers being included in the first set of MIMO layers.

11. The apparatus of claim 9, wherein the first number of MIMO layers corresponds to a first set of MIMO layers and the second number of MIMO layers corresponds to a second set of MIMO layers, the first set of MIMO layers being a separate set of MIMO layers from the second set of MIMO layers.

12. The apparatus of claim 9, wherein the second UCI is mapped to a single MIMO layer corresponding to the second number of MIMO layers.

13. The apparatus of claim 9, wherein a set of MIMO layers associated with the mapping of the first UCI and the second UCI includes different modulation orders, the second UCI being mapped to at least one MIMO layer that corresponds to a highest modulation order of the different modulation orders for the set of MIMO layers.

14. The apparatus of claim 13, further comprising at least one of a transceiver or an antenna coupled to the at least one processor, wherein the second modulation order of the second UCI is less than or equal to the highest modulation order of the different modulation orders for the set of MIMO layers.

15. An apparatus for wireless communication at a network node, comprising:
a memory; and
at least one processor coupled to the memory and configured to:
signal information associated with at least one of first uplink control information (UCI) of a first priority or second UCI of a second priority, the second priority corresponding to a higher priority than the first priority; and
receive, based on the signaled information, an uplink (UL) transmission including the first UCI of the first priority multiplexed with the second UCI of the second priority, the first UCI including at least one of a first modulation order or a first number of multiple-input multiple-output (MIMO) layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

16. The apparatus of claim 15, wherein one or more of the first priority of the first UCI or the second priority of the second UCI is based on a priority indicator included in at least one of downlink control information (DCI) that schedules a physical downlink shared channel (PDSCH) associated with one or more of the first UCI or the second UCI, or a radio resource control (RRC) configuration of the one or more of the first UCI or the second UCI.

17. The apparatus of claim 16, wherein the first priority is indicated by the priority indicator based on a value of 0, and wherein the second priority is indicated by the priority indicator based on a value of 1.

18. The apparatus of claim 15, wherein at least one of the first UCI or the second UCI is multiplexed on a physical uplink shared channel (PUSCH), the first modulation order of the first UCI being a same modulation order as a modulation order of the PUSCH, the second modulation order of the second UCI being a lower modulation order than the modulation order of the PUSCH.

19. The apparatus of claim 15, wherein at least one of the first UCI or the second UCI is multiplexed on a physical uplink shared channel (PUSCH), the first modulation order of the first UCI and the second modulation order of the second UCI being a same modulation order as a modulation order of the PUSCH when the first modulation order of the first UCI corresponds to a lowest modulation order of a set of modulation orders.

20. The apparatus of claim 15, wherein at least one of the first UCI or the second UCI is multiplexed on a physical uplink shared channel (PUSCH), the first number of MIMO layers of the first UCI being a same number of MIMO layers as a number of MIMO layers of the PUSCH, the second number of MIMO layers of the second UCI being a lower number of MIMO layers than the number of MIMO layers of the PUSCH.

21. The apparatus of claim 15, wherein at least one of the first UCI or the second UCI is multiplexed on a physical uplink shared channel (PUSCH), the first number of MIMO layers of the first UCI and the second number of MIMO layers of the second UCI being a same number of MIMO layers as a number of MIMO layers of the PUSCH when the first number of MIMO layers is equal to one MIMO layer.

22. The apparatus of claim 15, wherein at least one of a type of the second modulation order or a number of the second number of MIMO layers is included in the information in association with at least one of the first modulation order being greater than the second modulation order or the first number of MIMO layers being greater than the second number of MIMO layers.

23. The apparatus of claim 15, wherein the first UCI is mapped to the first number of MIMO layers and the second UCI is mapped to the second number of MIMO layers.

24. The apparatus of claim 23, wherein the first number of MIMO layers corresponds to a first set of MIMO layers and the second number of MIMO layers corresponds to a second set of MIMO layers, the second set of MIMO layers being included in the first set of MIMO layers.

25. The apparatus of claim 23, wherein the first number of MIMO layers corresponds to a first set of MIMO layers and the second number of MIMO layers corresponds to a second set of MIMO layers, the first set of MIMO layers being a separate set of MIMO layers from the second set of MIMO layers.

26. The apparatus of claim 23, wherein the second UCI is mapped to a single MIMO layer corresponding to the second number of MIMO layers.

27. The apparatus of claim 23, wherein a set of MIMO layers associated with the mapping of the first UCI and the second UCI includes different modulation orders, the second UCI being mapped to at least one MIMO layer that corresponds to a highest modulation order of the different modulation orders for the set of MIMO layers.

28. The apparatus of claim 27, further comprising at least one of a transceiver or an antenna coupled to the at least one processor, wherein the second modulation order of the second UCI is less than or equal to the highest modulation order of the different modulation orders for the set of MIMO layers.

29. A method of wireless communication at a user equipment (UE), comprising:
multiplexing first uplink control information (UCI) of a first priority with second UCI of a second priority, the first UCI including at least one of a first modulation order or a first number of multiple-input multiple-output (MIMO) layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI; and transmitting, to a network node, an uplink (UL) transmission including the first UCI of the first priority multiplexed with the second UCI of the second priority, the second priority corresponding to a higher priority than the first priority.

30. A method of wireless communication at a network node, comprising:

signaling information associated with at least one of first uplink control information (UCI) of a first priority or second UCI of a second priority, the second priority corresponding to a higher priority than the first priority; and receiving, based on the signaled information, an uplink (UL) transmission including the first UCI of the first priority multiplexed with the second UCI of the second priority, the first UCI including at least one of a first modulation order or a first number of multiple-input multiple-output (MIMO) layers and the second UCI including at least one of a second modulation order or a second number of MIMO layers, the first modulation order of the first UCI being greater than or equal to the second modulation order of the second UCI, the first number of MIMO layers of the first UCI being greater than or equal to the second number of MIMO layers of the second UCI.

* * * * *